United States Patent
Grant et al.

(10) Patent No.: US 7,823,006 B2
(45) Date of Patent: Oct. 26, 2010

(54) ANALYZING PROBLEM SIGNATURES

(75) Inventors: David Grant, Duvall, WA (US); Vamshidhar Radha Kommineni, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 683 days.

(21) Appl. No.: 11/754,428

(22) Filed: May 29, 2007

(65) Prior Publication Data
US 2008/0301501 A1  Dec. 4, 2008

(51) Int. Cl.
*G06F 11/00* (2006.01)

(52) U.S. Cl. ......................................................... 714/5
(58) Field of Classification Search ....................... 714/5
See application file for complete search history.

(56) References Cited

U.S. PATENT DOCUMENTS

| | | | |
|---|---|---|---|
| 4,903,194 A * | 2/1990 | Houdek et al. ................. | 714/53 |
| 5,111,384 A | 5/1992 | Aslanian et al. | |
| 5,335,341 A * | 8/1994 | Chana ........................... | 714/37 |
| 5,339,406 A | 8/1994 | Carney et al. | |
| 6,430,707 B1 | 8/2002 | Matthews et al. | |
| 6,633,876 B1 | 10/2003 | Heatlie | |
| 6,681,348 B1 | 1/2004 | Vachon | |
| 6,745,321 B1 | 6/2004 | Floyd et al. | |
| 6,789,216 B2 | 9/2004 | Zagorski et al. | |
| 6,832,373 B2 * | 12/2004 | O'Neill ........................ | 717/171 |
| 6,915,426 B1 * | 7/2005 | Carman et al. ............... | 713/168 |
| 6,952,793 B2 | 10/2005 | Nagasuka et al. | |
| 7,028,056 B1 | 4/2006 | Hendel et al. | |
| 7,546,492 B2 * | 6/2009 | McCuller ...................... | 714/52 |
| 7,702,959 B2 * | 4/2010 | Hwang et al. ................. | 714/38 |
| 2004/0025081 A1 | 2/2004 | Gonzalez et al. | |
| 2004/0025093 A1 | 2/2004 | Willy et al. | |
| 2005/0160316 A1 * | 7/2005 | Shipton ........................ | 714/22 |
| 2006/0156057 A1 * | 7/2006 | Babu ............................ | 714/5 |
| 2006/0190773 A1 * | 8/2006 | Rao et al. ..................... | 714/38 |
| 2007/0168708 A1 * | 7/2007 | McCuller ...................... | 714/6 |
| 2008/0301501 A1 * | 12/2008 | Grant et al. ................... | 714/37 |
| 2009/0031166 A1 * | 1/2009 | Kathail et al. ................. | 714/4 |

OTHER PUBLICATIONS

Smith, E., "Automated Test Results Processing the Art of Automated Crash Dump & Log Analysis," Mangosoft Incorporated, 2001, http://www.mangosoft.com/technology/AutomatedTestResultsProcessing.pdf.
Frascone, D., "eCrash: Debugging without Core Dumps," http://delivery.acm.org/10.1145/1160000/1152908/8724.html?key1=1152908&key2=530250271.
Anick, P., "Adapting a Full-text Information Retrieval System to the Computer Troubleshooting Domain," http://portal.acm.org/citation.cfm?id=188599&dl=ACM&coll=portal.

* cited by examiner

*Primary Examiner*—Robert Beausoliel
*Assistant Examiner*—Amine Riad
(74) *Attorney, Agent, or Firm*—Marshall, Gerstein & Borun LLP

(57) ABSTRACT

A method of analyzing problem data from a computer application is disclosed. The method evaluates a memory dump, identifying call stacks within the memory dump that are related to application failures, creates a hash of the identified call stack and adds the hash to a database. The database may then be evaluated to look for trends in the error data such as whether the same call stack is causing problems.

19 Claims, 2 Drawing Sheets

ANALYZING PROBLEM SIGNATURES

BACKGROUND

This Background is intended to provide the basic context of this patent application and it is not intended to describe a specific problem to be solved.

When debugging software errors, it is impossible to accurately analyze and mine patterns in the error information without accurate symbols. Symbol files are data files that contain information about the application programs with which they're associated. This information includes things like function names and their location in memory, global and local variable names and their location in memory, and source-code line information (this information lets each assembler command be mapped back to the line of source code associated with the command). This information is generated during compilation of the application program and is very useful for debugging the application program when it experiences a failure. There are multiple file formats for storage of symbols including Microsoft's Program database (PDB) files, but the discussion applies generally to all symbols formats. When debugging an application crash (either directly on the computer experiencing the crash) or via a memory dump or memory dumps from the computer, it is not possible to understand the trends and patterns in the crash (or across all crashes) without having correct debugging symbols for all of the loaded modules. Unfortunately since most software companies do not publish public symbols for their applications, the understanding and broad analysis of application crashes has been limited to software products that include symbols.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of analyzing problem data from a computer application is disclosed. The method evaluates a memory dump, identifying call stacks within the memory dump that are related to application failures, creates a hash of the identified call stack and adds the hash to a database. The database may then be evaluated to look for trends in the error data such as the same call stack is causing problems. The input to the hash function may be the concatenation of an application module name and a function name for each frame on the identified call stack. In another embodiment, the concatenation of a module name and a function name along with a function offset into the module is used as an input to the hash and in yet another embodiment, the hash is the concatenation of an application module name, function name and function's offset in the module for each frame group where the frame group comprises a contiguous set of functions within the same module. The additional information added to the hash may result in better and more specific identification of problem code.

DRAWINGS

Figure 1:
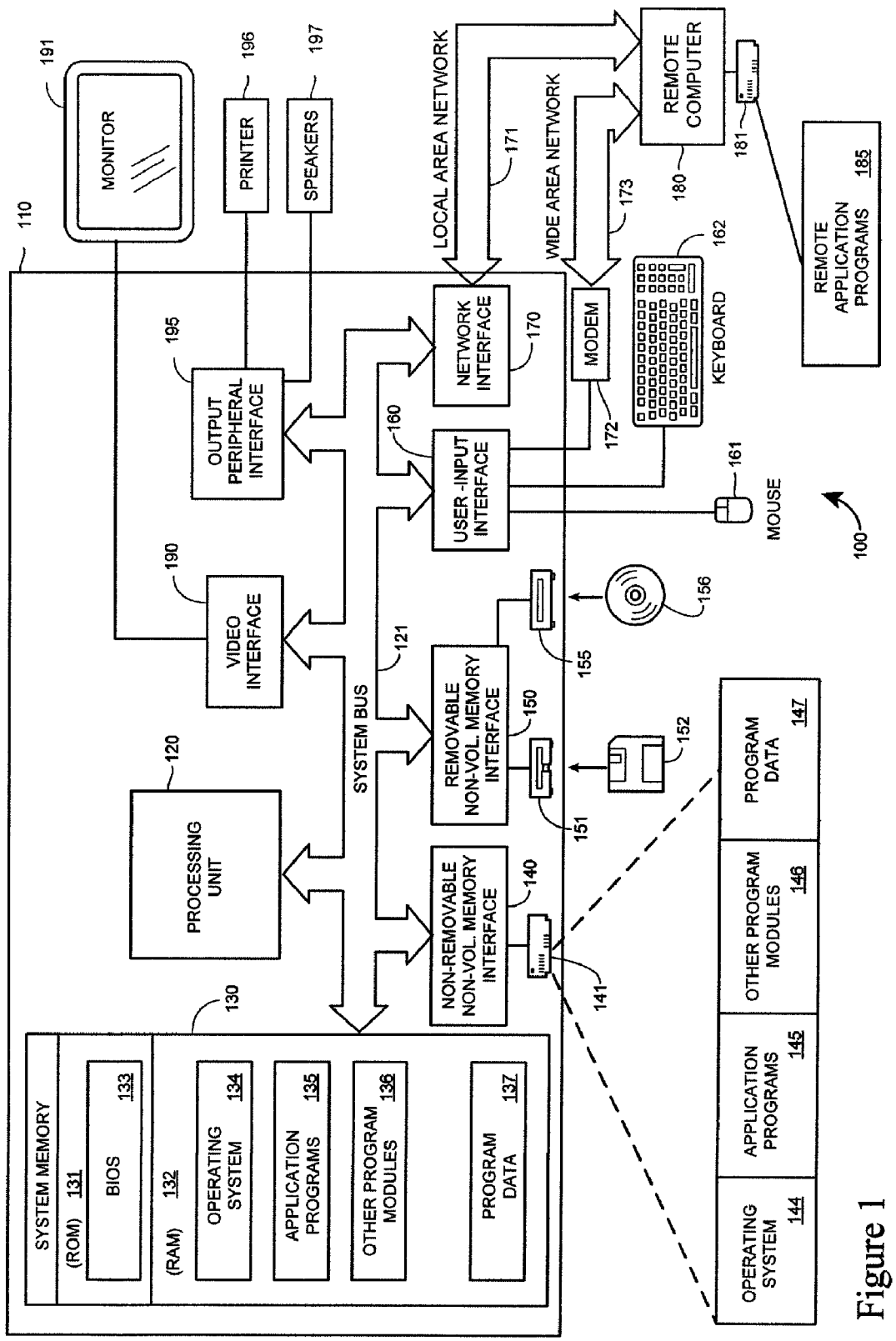
Figure 2:
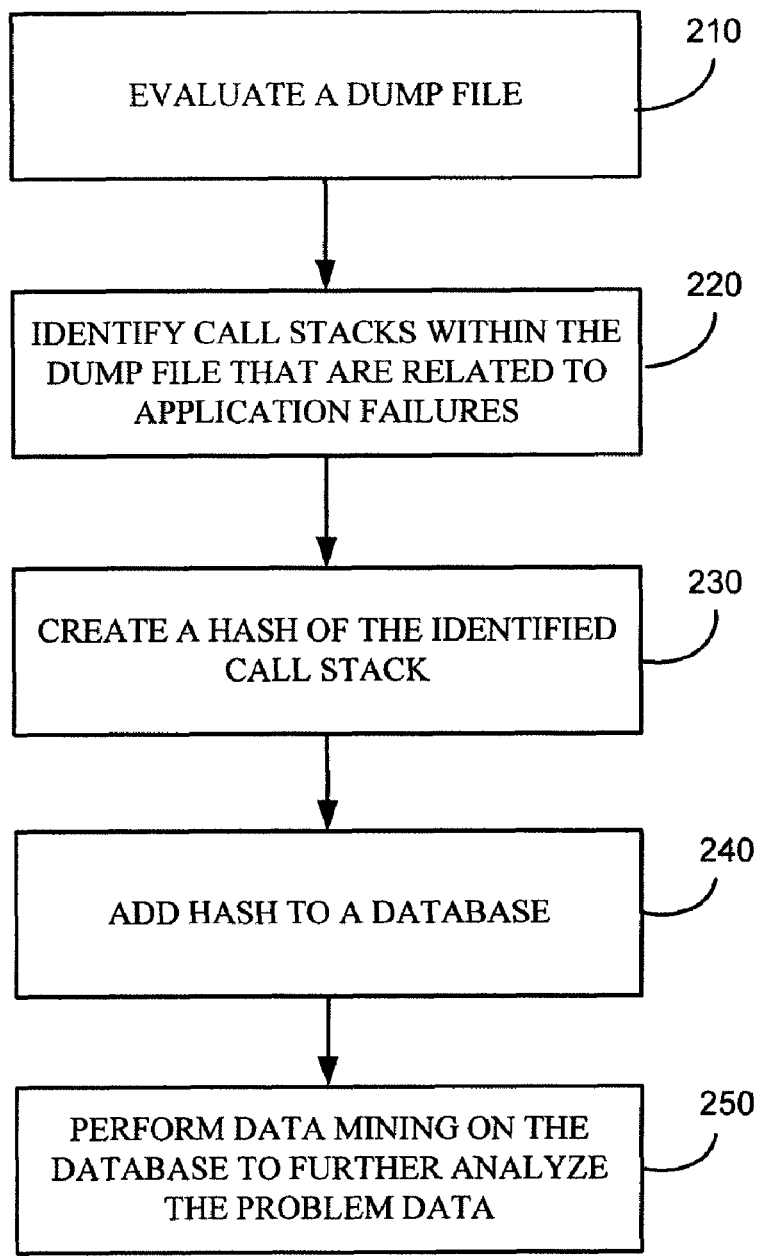

FIG. 1 is a block diagram of a computing system that may operate in accordance with the claims; and FIG. 2 is a flowchart of a method of analyzing problem data from a computer application.

DESCRIPTION

Although the following text sets forth a detailed description of numerous different embodiments, it should be understood that the legal scope of the description is defined by the words of the claims set forth at the end of this patent. The detailed description is to be construed as an example only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect-Express (PCI-E).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

FIG. 2 is an illustration of a method of analyzing problem data from a computer application. If a computer application's symbols are available at the time of the analysis depicted in FIG. 2, the symbols are used to help determine the specific cause of the problem or crash of the application. Symbol files are data files that contain information about the application programs with which they're associated. This information includes things like function names and their location in memory, global and local variable names and their location in memory, and source-code line information (this information lets each assembler command be mapped back to the line of source code associated with the command). This information is generated during compilation of the application program and is very useful for debugging the application program when it experiences a failure. There are multiple file formats for storage of symbols including Microsoft's Program database (PDB) files, but the discussion applies generally to all symbols formats.

If a computer application symbols are not available at the time of the analysis depicted in FIG. 2, the ability to pinpoint to cause of the computer application failure or crash is greatly limited. One problem that often is encountered is that without symbols, the debugger may classify all of the failures in a given module into the same "failure." By using the callstack hashes described below someone evaluating the failure may be able to breakup this larger failure into accurate classifications. As a result, rather than being unaware of the relative priority of all the issues in a computer application, the top issues for a computer code module and example cabs may be found.

Another problem that often encountered is that a single mid-level function call is may be responsible for crashes that manifest themselves across a wide range of applications and callstacks. Identifying these mid-level functions often requires intensive manual investigation which is hampered by a lack of symbols. Using the frame group hashes as described below may allow a debugger to identify common frame groups regardless of symbols which focuses the debugging effort on those suspect frames.

Another problem that is often encountered is that while investigating large number of memory dumps and working to improve debugger technologies, human debuggers often have to manually investigate cabs based on the debuggers classification to determine if the classification was correct. By grouping the cabs based on their unique callstack hashes (explained below), the debugger is able to identify failures and issues with a large number of unique callstacks which may indicate that the current automated debugger classification needs further refinement—thus allowing the developer to be more efficient in deploying his resources to fixing the right problems.

Another problem that is often encountered is that when a developer "fixes" an issue, the fix may or may not actually fix the issue and may or may not fix all of the root causes or code paths which cause this issue. Using the callstack hashes as described below, the debugger may be able to effectively classify the existing and future dumps to determine if any of the known root causes or code paths continue to be reported or if they are no longer reported which enables the developer to focus his/her attention on the root causes or code paths the fix did not address.

At block 210, a memory dump may be evaluated. Memory dumps are often created when a computer application crashes or otherwise does not perform as intended. Memory dumps contain a snapshot of the memory space of a process, and are most useful when that process is failing—hanging, crashing, etc. There are two common types of memory dumps: full and mini dumps. A full mode dump is typically much larger than a mini dump because it contains all committed pages of memory owned by the application. A mini dump only includes selected parts of a process's memory (basically just call stacks). As an example, a full dump of Microsoft notepad.exe editing a small text file may be about 20 MB, whereas a mini dump would be around 7 KB.

Memory dumps capture a call stack. A developer or analysis program can see exactly what the application was doing at the time the problem occurred. There is no ambiguity; the call stack reveals exactly what is happening within the process. Most of the time, problem code may be quickly identified and the issue can be resolved.

At block 220, call stacks may be identified within the memory dump that are related to application failures. Debuggers, both human and analysis applications, have the ability to narrow down the cause of an error and these call stacks may be identified.

At block 230, a hash of the identified call stack may be created. A hash function is a reproducible method of turning some kind of data into a (relatively) small number that may serve as a digital "fingerprint" of the data. The algorithm substitutes or transposes the data to create such fingerprints. The fingerprints are called hash sums, hash values, hash codes or simply hashes. In one embodiment, the hash is an SHA1 hash, but virtually any strong hash function would work. The following hashes may be created:

1. Complete Module+Function
2. Complete Module+Function+Offset
3. Frame Group Module+Function+Offset In one embodiment, a set of information from the dump's callstack is used as the input for an SH1 hash. For illustration the following descriptions use this hypothetical callstack:

Module1!Function1+0x01
Module1!Function2+0x04
Module2!Function1+0x02
Module2!Function2+0x10
Module3!Function1+0x05
Module3!Function2+0x08
Module2!Function3+0x11
Module2!Function2+0x10

Complete Module+Function

In this embodiment, the module name and function name are concatenated for each frame as the input for a single SHA1 hash representing the entire callstack. As a result, this embodiment accurately classifies callstacks where symbols are available for all frames. In addition, instead of needing to communicate entire callstacks, only hashes of the callstacks are communicated. The hashing of the callstacks also results in improved security as opposed to communicating entire uncashed callstacks.

Complete Module+Function+Offset

In this embodiment, the module and function names along with the function's offset in the module are concatenated as the input for a single SHA1 hash of the entire callstack. As a result, this may accurately classify callstacks where symbols are not available for all frames. Similar to the above embodiment, the hash is smaller than the entire callstack and security of the callstack is improved using a hash function.

Frame Group Module+Function+Offset

In this embodiment, the module name, function name and function's offset in the module for each "frame group" or contiguous set of functions within the same module are concatenated and used as input for a hash. The result of this embodiment is a hash for EACH frame group within a callstack. As a result, this approach may accurately classify frame group signatures which are useful for analyzing mid-stack frame groups responsible for the crash or hang across multiple dumps (even if the symbols aren't available for all of the frames in all of the dumps).

$$\left.\begin{array}{l}\text{Module1 !Function1} + 0 \times 01 \\ \text{Module1 !Function2} + 0 \times 04\end{array}\right\} \text{Frame Group 1's hash}$$

$$\left.\begin{array}{l}\text{Module2 !Function1} + 0 \times 02 \\ \text{Module2 !Function2} + 0 \times 10\end{array}\right\} \text{Frame Group 2's hash}$$

$$\left.\begin{array}{l}\text{Module3 !Function1} + 0 \times 05 \\ \text{Module3 !Function2} + 0 \times 08\end{array}\right\} \text{Frame Group 3's hash}$$

$$\left.\begin{array}{l}\text{Module2 !Function3} + 0 \times 11 \\ \text{Module2 !Function2} + 0 \times 10\end{array}\right\} \text{Frame Group 4's hash}$$

At block 240, the hash may be added to a database. At block 250, data mining may be performed on the database to further analyze the problem data. For example, the database may be identified to identify problems that are most prevalent. In addition, the database of hashes may be analyzed to classify unique callstacks and probable code defects across a large number of memory dumps for issues for which valid symbols are not available. In addition, the hashes may be used to classify mid-level functions across a range of memory dumps to identify common code paths that may be responsible for all of the crashes even if symbols are not available for all modules.

By using a hash function, significant memory is saved. A common result of a hash of a stack is 128 bytes where the size of the stack will be orders of magnitude larger. In addition, as the hashes are smaller, they may be more easily searched and classified. In this way, problems that are most prevalent may be quickly identified and addressed. In addition, if a solution to a problem has been promulgated, the results of the solution may be quickly known if the hash related to the particular error stops occurring once the fix has been promulgated.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of sorting problem data from a computer application comprising:
evaluating a dump file;
identifying call stacks within the dump file that are related to application failures;
creating a hash of the identified call stack by concatenating an application module name and function name for each frame as an input to the hash function; and
adding the hash to a database.

2. The method of claim 1, wherein the hash classifies callstacks where symbols are available for all frames.

3. The method of claim 1, wherein creating a hash further comprises concatenating a module name and a function name along with a function offset in the module and using the result as an input to the hash function.

4. The method of claim 3, wherein the hash classifies callstacks where symbols are not available for all frames.

5. The method of claim 3, further comprising using the database of hashes to classify unique callstacks and probable code defects across a large number of dump files for issues for which valid symbols are not available.

6. The method of claim 1, wherein creating a hash further comprises concatenating an application module name, function name and function's offset in the module for each frame group wherein the frame group comprises a contiguous set of functions within the same module.

7. The method of claim 6, wherein the hash classifies frame group signatures.

8. The method of claim 7, wherein the frame group signatures are used to analyze mid-stack groups responsible for a crash or hang across multiple dumps.

9. The method of claim 6, further comprising using the hashes to classify mid-level functions across a range of dump files to identify common code paths that may be responsible for all of the crashes even if symbols are not available for all modules.

10. The method of claim 1, further comprising performing statistical analysis on the database to further analyze the problem data.

11. The method of claim 10, further comprising analyzing the database to identify problems that are most prevalent.

12. A computer storage medium for storing computer executable code for sorting problem data from a computer application, the computer executable code comprising:
evaluating a dump file;
identifying call stacks within the dump file that are related to application failures;
creating a hash of the identified call stack wherein creating a hash further comprises concatenating an application module name and function name for each frame as an input to the hash function; and
adding the hash to a database.

13. The computer storage medium of claim 12, wherein creating a hash further comprises concatenating a module name and a function name along with a function offset in the module and using the result as an input to the hash function.

14. The computer storage medium of claim 13, further comprising using the database of hashes to classify unique callstacks and probable code defects across a large number of dump files for issues for which valid symbols are not available.

15. The computer storage medium of claim 12, wherein creating a hash further comprises concatenating an application module name, function name and function's offset in the module for each frame group wherein the frame group comprises a contiguous set of functions within the same module.

16. The computer storage medium of claim 15, further comprising using the hashes to classify mid-level functions across a range of dump files to identify common code paths that may be responsible for all of the crashes even if symbols are not available for all modules.

17. The computer storage medium of claim 12, further comprising performing statistical analysis on the database to further analyze the problem data.

18. A computer system comprising a processor for executing computer executable instructions, a memory for storing computer executable instructions and an input output circuit, the processor being physically configured to execute computer executable code for sorting problem data from a computer application, the computer executable code comprising code for:

evaluating a dump file;

identifying call stacks within the dump file that are related to application failures;

creating a hash of the identified call stack wherein creating a hash further comprises concatenating an application module name and function name for each frame as an input to the hash function;

adding the hash to a database; and performing statistical analysis on the database to further analyze the problem data.

19. The computer system of claim 18, wherein creating a hash further comprises concatenating a module name and a function name along with a function offset in the module and using the result as an input to the hash function.

\* \* \* \* \*